(No Model.)

W. O. NELSON.
COMBINED CALIPER AND CENTERING GAGE.

No. 439,975. Patented Nov. 4, 1890.

WITNESSES:
Fred G. Dieterich
Edw. H. W. Byrn.

INVENTOR:
William O. Nelson.
BY Munn & Co.
ATTORNEYS

UNITED STATES PATENT OFFICE.

WILLIAM O. NELSON, OF BALTIMORE, MARYLAND.

COMBINED CALIPER AND CENTERING GAGE.

SPECIFICATION forming part of Letters Patent No. 439,975, dated November 4, 1890.

Application filed February 17, 1890. Serial No. 340,735. (No model.)

*To all whom it may concern:*

Be it known that I, WILLIAM O. NELSON, a citizen of the United States, residing at Baltimore, in the State of Maryland, have invented certain new and useful Improvements in a Combined Caliper and Centering Gage, of which the following is a full, clear, and exact description.

The object of my invention is to provide a simple and accurate caliper and centering gage to be employed for determining diameters and transverse measurements and fixing the centers of shafts preparatory to turning the same in a lathe.

It consists in a main plate and a sliding plate, which together form a caliper-gage at one end and a centering-gage at the other, which always with one adjustment fixes the center of any shaft whose diameter is measured by the caliper-gage, as hereinafter fully described.

Figure 1:
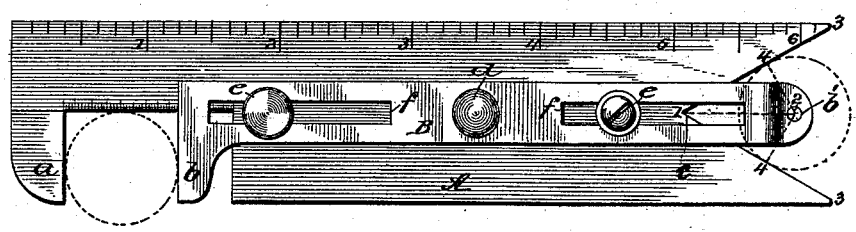
Figure 2:
Figure 3:
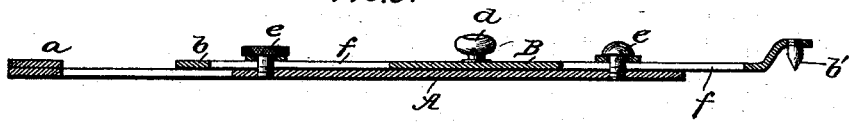

Figure 1 is a top plan view. Fig. 2 is a bottom plan view, and Fig. 3 is a longitudinal section.

A represents the main plate, which is preferably made about six inches long and an inch and a quarter wide, and has upon its side near one end a square notch having a lug $a$ projecting at right angles and forming one of the gage-jaws of the calipers. The other end of the plate has in its end a V-shaped notch $c$, subtending an angle of sixty degrees.

On top of plate A and in the middle of the same is arranged a longitudinal slide B. This slide has at one end a right-angular gage-jaw $b$, facing the jaw $a$ and parallel to it, and at the other end said slide is raised or offset from the plate and provided with a steel marking-pin $b'$, which moves with the slide in a longitudinal line, which exactly bisects the angle at $c$. This slide has a knob $d$ for moving it, and it is held to the subjacent plate with a close frictional contact by means of two set-screws $e\ e$, which pass through slots $f\ f$ in the slide into the subjacent plate. These screws have washers under their heads, and one or both of them is provided with a milled head or nut, which permits it to be tightened to prevent any accidental loss of adjustment. Instead of using these screws and slots for guiding the slide, any other desirable means—such as lugs on the plate A—may be employed.

In making use of this invention the rod or shaft, whose diameter and center are sought, is first placed between the edges $a$ and $b$ and the slide bearing the edge $b$ is forced up till it rests against the shaft, so that the gage measures its diameter. Without allowing the slide to move, the shaft is then transferred to the V-shaped notch and the steel pin $b'$ on the slide exactly marks the center. This adjustment of the caliper always gives the position to the centering-pin, which marks the center of any size of shaft or rod which may be placed in the calipers. My invention is founded upon the observation of this fact, that with an angle of sixty degrees the pin, when projected in a line bisecting that angle in the middle, is always a distance from the sides of that angle equal to half the diameter of the circle or distance between the caliper edges—that is to say, if the diameter of a circle between the caliper edges is one-half inch, then its radius is one-fourth inch, and when the pin is moved the distance 1.2, equal to the diameter of the circle between the caliper-jaws, the said point at 2 will exactly be the distance of a semi-diameter 2.4 from the side 1.3 of the angular notch of sixty degrees, and a circle tangent to the sides of the notch at 4 will be a circle of the same diameter as that between the caliper-jaws, and hence the pin at 2 will mark its center. This relation of the pin to the sides of the triangular notch and the circle to the edges of the calipers is constant and correlated in all adjustments for all sizes of rods and shafts.

To render the tool more useful, I prefer to graduate one side of the plate A in inches and larger fractions of inches, while the space or plate A between the caliper edges is subdivided into very fine graduations.

Having thus described my invention, what I claim as new, and desire to secure by Letters Patent, is—

1. A combined caliper and centering gage consisting of two plates adjustably connected, one end of each being arranged to form the caliper-jaws and the other end the centering-gage, substantially as shown and described.

2. A combined caliper and centering gage consisting of a main plate having at one end one jaw of the calipers and at the other end a V-shaped notch or seat, in combination with an adjustable slide carried upon the main plate and having at one end the other jaw of the calipers and at the other end a centering-pin, substantially as shown and described.

3. A combined caliper and centering gage consisting of a main plate having at one end one jaw of the calipers and at the other end a V-shaped notch of sixty degrees, in combination with an adjustable slide carried upon the main plate and having at one end the other jaw of the calipers and at the opposite end a centering-pin arranged to slide in a line bisecting the V-shaped angle, guides for holding it upon the main plate, and a set-screw, substantially as shown and described.

WILLIAM O. NELSON.

Witnesses:
J. Q. A. SAND,
T. F. CAVANAUGH.